(12) United States Patent
Shimokawa

(10) Patent No.: US 11,115,553 B2
(45) Date of Patent: Sep. 7, 2021

(54) INFORMATION PROCESSING SYSTEM FOR DETECTING IMAGE INFORMATION AND NON-TRANSITORY COMPUTER READABLE MEDIUM

(71) Applicant: FUJIFILM Business Innovation Corp., Tokyo (JP)

(72) Inventor: Noriyuki Shimokawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/734,379

(22) Filed: Jan. 5, 2020

(65) Prior Publication Data

US 2021/0037159 A1  Feb. 4, 2021

(30) Foreign Application Priority Data

Jul. 29, 2019  (JP) .............................. JP2019-138871

(51) Int. Cl.
*H04N 1/00* (2006.01)
*H04L 29/08* (2006.01)

(52) U.S. Cl.
CPC ..... *H04N 1/00843* (2013.01); *H04N 1/00244* (2013.01); *H04N 1/00856* (2013.01); *H04L 67/10* (2013.01)

(58) Field of Classification Search
CPC ........... H04N 1/00843; H04N 1/00244; H04N 1/00856; H04L 67/10
See application file for complete search history.

(56) References Cited

U.S. PATENT DOCUMENTS

| 7,573,615 | B2 | 8/2009 | Kasatani | |
| 9,412,017 | B1* | 8/2016 | Huang | G06K 9/20 |
| 2005/0195446 | A1* | 9/2005 | Kasatani | H04N 1/00225 |
| | | | | 358/402 |
| 2010/0060925 | A1* | 3/2010 | Thomas | G06F 21/608 |
| | | | | 358/1.15 |
| 2012/0038732 | A1* | 2/2012 | Iguchi | H04N 1/00652 |
| | | | | 347/179 |
| 2013/0208296 | A1* | 8/2013 | Yoshida | H04N 1/00244 |
| | | | | 358/1.14 |
| 2019/0303056 | A1* | 10/2019 | Matysiak | G06F 3/1244 |
| 2020/0242260 | A1* | 7/2020 | Chen | G06K 9/00 |
| 2020/0250323 | A1* | 8/2020 | Remington | G06F 21/629 |

FOREIGN PATENT DOCUMENTS

| JP | 2005244411 | 9/2005 |
| JP | 2005275849 | 10/2005 |
| JP | 2010-061551 | 3/2010 |

* cited by examiner

*Primary Examiner* — Juan M Guillermety
(74) *Attorney, Agent, or Firm* — JCIPRNET

(57) ABSTRACT

An information processing system includes a registration unit and a controller. The registration unit registers prohibited information associated with at least one of pieces of attribute information on a per piece-of-attribute information basis. The controller refers to the pieces of attribute information and the prohibited information. The controller performs error handling if received image information includes the prohibited information associated with a piece of attribute information assigned to the image information.

14 Claims, 6 Drawing Sheets

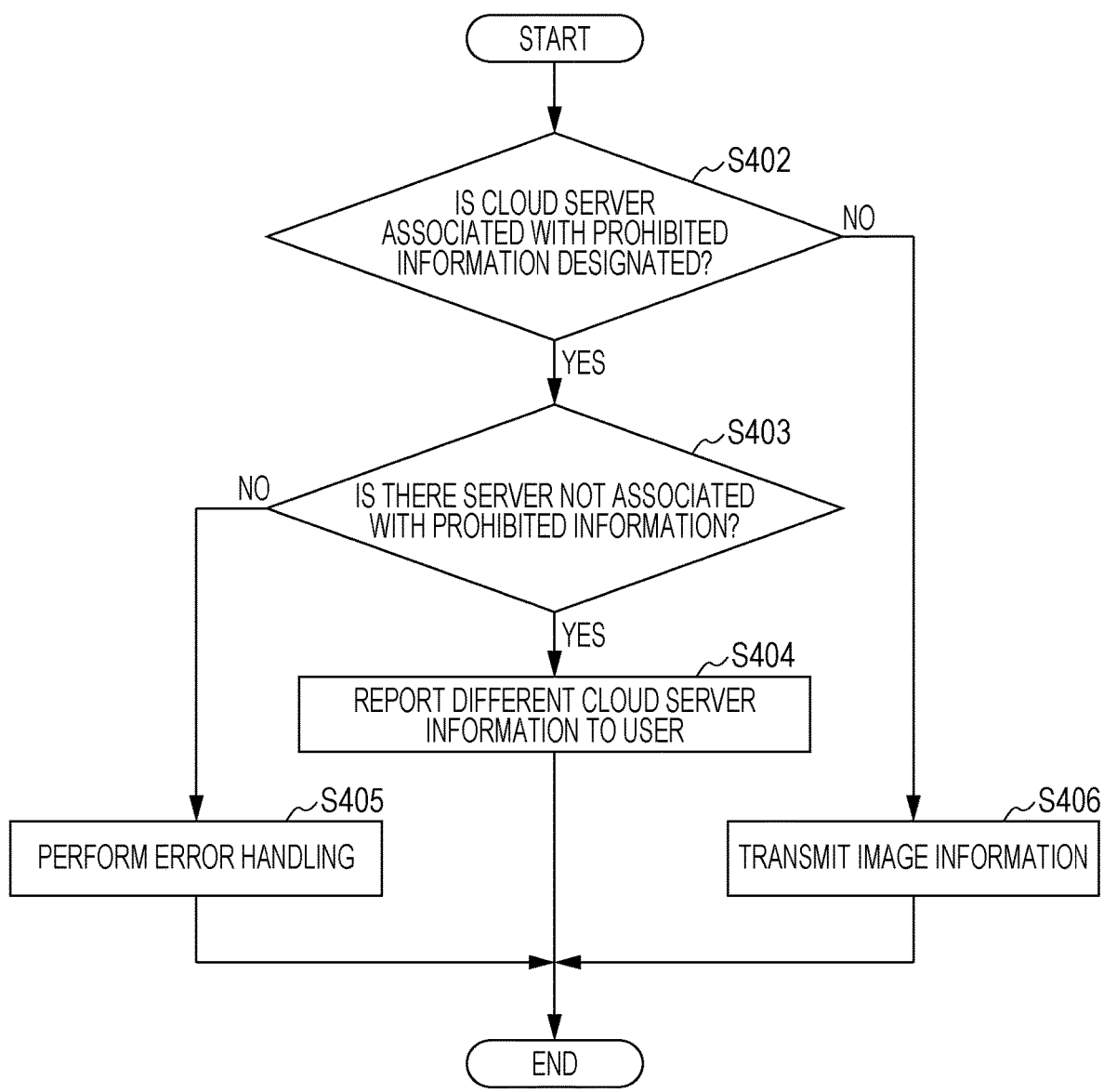

INFORMATION PROCESSING SYSTEM FOR DETECTING IMAGE INFORMATION AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-138871 filed Jul. 29, 2019.

BACKGROUND

(i) Technical Field

The present disclosure relates to an information processing system and a non-transitory computer readable medium.

(ii) Related Art

Japanese Unexamined Patent Application Publication No. 2010-61551 discloses an application document electronization system including an image forming apparatus and an information processing apparatus. The information processing apparatus transmits application document data generated by scanning an application document. The image forming apparatus includes application document data acquisition unit, an application document data transmission unit, a recognition result reception unit, and a recognition result display. The application document data acquisition unit acquires application document data by scanning one or more sets of application documents each composed of one or more pages. The application document data transmission unit transmits the application document data acquired by the application document data acquisition unit to the information processing apparatus. The recognition result reception unit receives a recognition result including division information regarding the application document data from the information processing apparatus. The recognition result display displays the recognition result including the division information regarding the application document data received by the recognition result reception unit. The information processing apparatus includes an application document data reception unit, an image recognition unit, a division information generation unit, and a recognition result transmission unit. The application document data reception unit receives the application document data transmitted from the image forming apparatus. The image recognition unit performs predetermined image recognition on the application document data received by the application document data reception unit. The division information generation unit generates the division information for dividing the application document data into sets of pieces of application document data in accordance with the result of the recognition performed by the image recognition unit. The recognition result transmission unit transmits the recognition result including the division information generated by the division information generation unit to the image forming apparatus.

SUMMARY

Aspects of non-limiting embodiments of the present disclosure relate to providing an information processing system and a non-transitory computer readable medium for a program that detect image information including prohibited information associated with attribute information and that cause error handling to be performed.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an information processing system including a registration unit and a controller. The registration unit registers prohibited information associated with at least one of pieces of attribute information on a per piece-of-attribute information basis. The controller refers to the pieces of attribute information and the prohibited information. The controller performs error handling if received image information includes the prohibited information associated with a piece of attribute information assigned to the image information.

BRIEF DESCRIPTION OF THE DRAWINGS

Exemplary embodiments of the present disclosure will be described in detail based on the following figures, wherein:

FIG. 7 is a flowchart illustrating the flow of a process executed by an information processing system according to a fourth exemplary embodiment.

DETAILED DESCRIPTION

Figure 1:
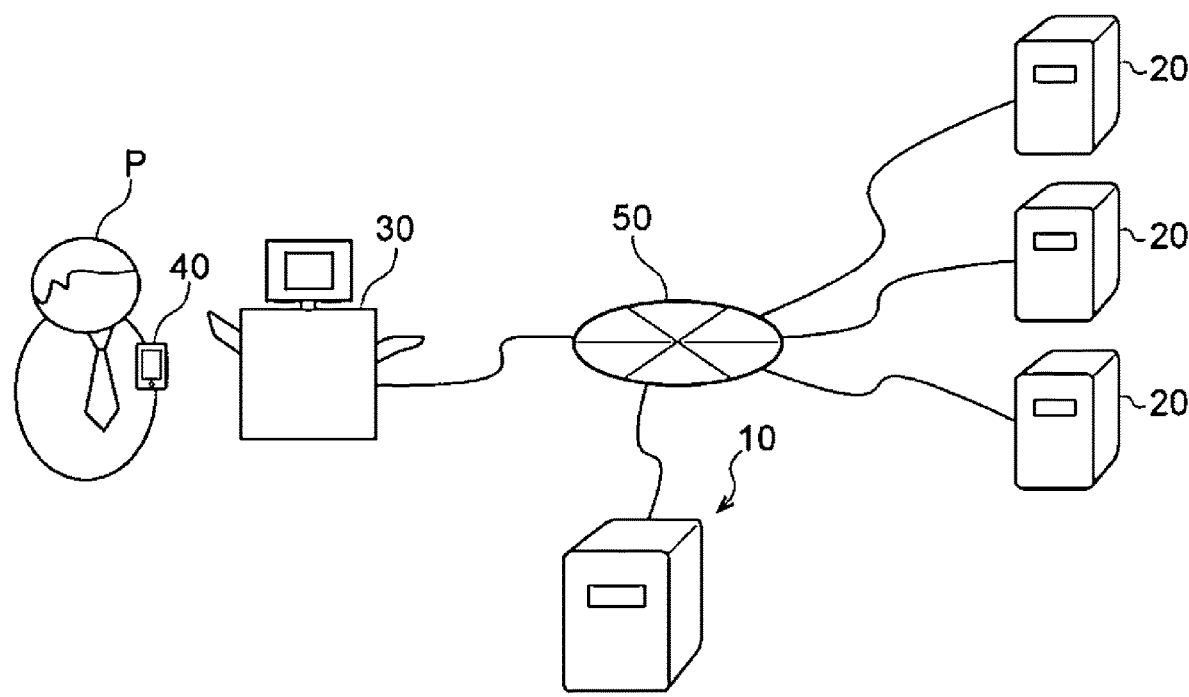
FIG. 1 is a diagram illustrating the schematic configuration of an information processing system according to a first exemplary embodiment.

Hereinafter, examples of exemplary embodiments of the technology of the present disclosure will be described with reference to the drawings. Note that the same or equivalent components or parts throughout the drawings are denoted by the same reference numerals. In addition, the ratio of the dimensions in each drawing is exaggerated conveniently for explanation and is different from the actual ratio in some cases.

First Exemplary Embodiment

An information processing system 10 according to a first exemplary embodiment of the present disclosure will be described by using FIGS. 1 to 5.

As illustrated in FIG. 1, an information processing system according to the first exemplary embodiment includes the information processing system 10 (hereinafter, appropriately referred to as the system 10) having components connected thereto via a network 50 to enable communications. This information processing system 10 is connected to a user terminal 30 including a user interface and to servers 20 serving as destinations for transmitting image information via the network 50 to enable communications.

The information processing system 10 is an intermediate system located between the user terminal 30 and the servers 20. Each server 20 provides, for example, a service for storing data as a cloud service. In this exemplary embodiment, the information processing system 10 verifies image information transmitted from the user terminal 30. Depending on the case, the information processing system 10 allows the image information to be uploaded to a server 20 or performs error handling in uploading.

The user terminal 30 is a terminal capable of generating image information in accordance with operation by a user and uploading the image information to a designated server 20. The user terminal 30 is, for example, a PC, a copier, a scanner, or a multifunctional printer having a complex of these functions. If the user terminal 30 has a scanning function, image information may be generated by reading a document. If the user terminal 30 is a PC, image information may be generated in such a manner that the user draws an image by using a predetermined application or performs an operation for generating a document.

The hardware configuration of the information processing system 10 will be described.

Figure 2:
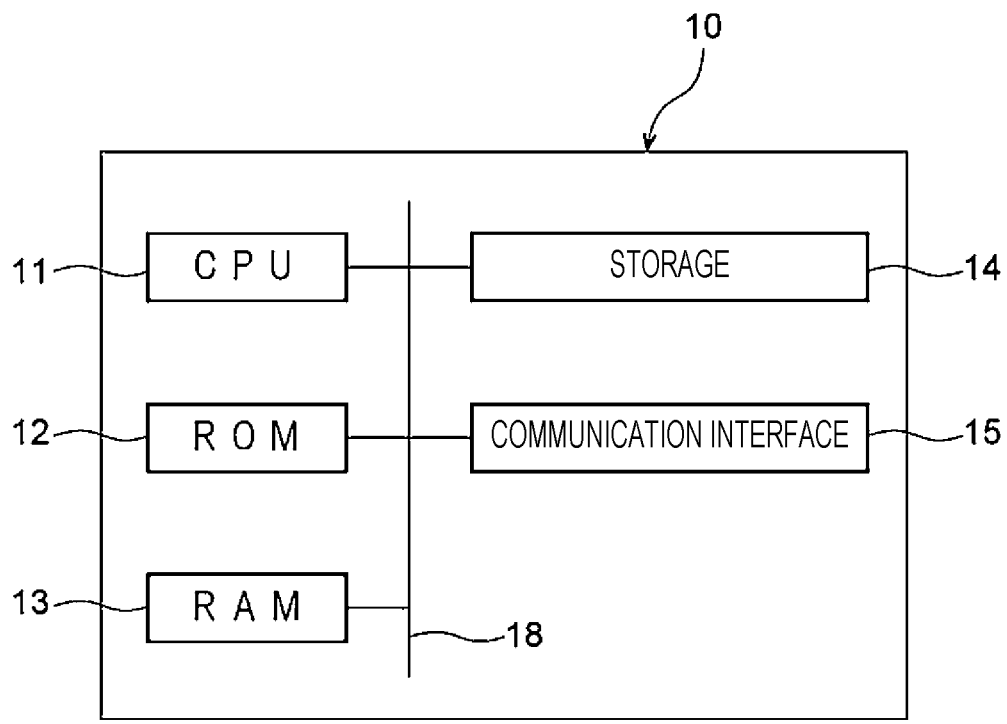
FIG. 2 is a block diagram illustrating the hardware configuration of the information processing system according to the first exemplary embodiment.

As illustrated in FIG. 2, the information processing system 10 includes a central processing unit (CPU) 11, a read only memory (ROM) 12, a random access memory (RAM) 13, a storage 14, and a communication interface 15. The components are mutually connected via a bus 18 to enable communications.

The CPU 11 performs running of various programs, control of components, and the like. Specifically, the CPU 11 reads out a program from the ROM 12 or the storage 14 and runs the program by using the RAM 13 as a work area. The CPU 11 performs control of the components and various arithmetic operations in accordance with the program recorded in the ROM 12 or the storage 14. In this exemplary embodiment, the ROM 12 or the storage 14 stores an information processing program.

The ROM 12 stores various programs and various pieces of data. The RAM 13, as a work area, temporarily stores a program or data. The storage 14 includes a hard disk drive (HDD) or a solid state drive (SSD) and stores various programs including an operating system or various pieces of data.

The communication interface 15 is an interface for communicating with different apparatuses such as the external servers 20 and the user terminal 30, and a standard such as Ethernet (registered trademark), Fiber distributed data interface (FDDI), or Wi-Fi (registered trademark) is used therefor.

The functional configuration of the system 10 will be described.

Figure 3:
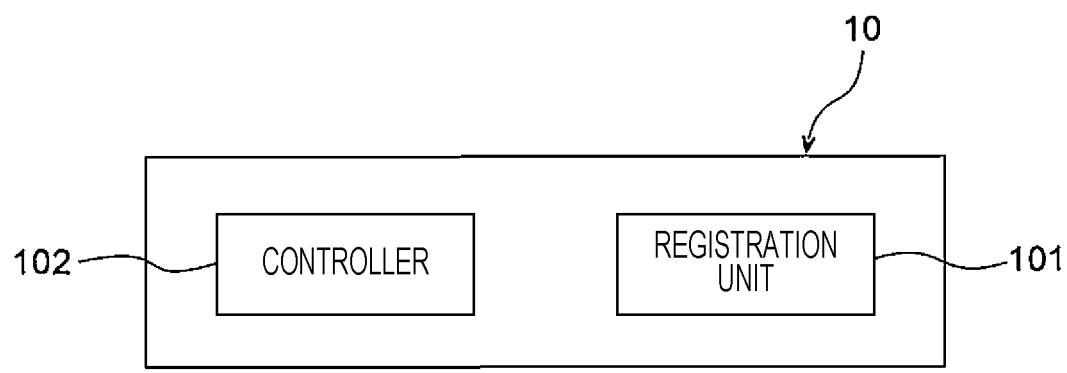
FIG. 3 is a functional block diagram illustrating an example functional configuration of the information processing system according to the first exemplary embodiment.

As illustrated in FIG. 3, the information processing system 10 includes, in a functional configuration, a registration unit 101 and a controller 102. The functional configuration is implemented in such a manner that the CPU 11 reads out the information processing program stored in the ROM 12 or the storage 14, loads the program into the RAM 13, and runs the program.

In the registration unit 101, prohibited information associated with attribute information in advance is registered. The term "attribute information" denotes information connected to the user terminal 30, a tenant (in other words, a store or a building) to whom the user terminal 30 belongs, a user P who uses the user terminal 30, an organization to which the user P belongs, or the like. The attribute information does not have to be uniquely assigned to a user or an apparatus, and pieces of attribute information may be grouped in advance on the basis of the attribute. The term "grouping" denotes grouping pieces of attribute information, for example, on the basis of multiple users who share the same user terminal 30 or who belong to the same organization (including a company, a department, a section, a group, or the like). The attribute information is assigned to image information by the user terminal 30 when a user performs an operation for generating image information. For example, in a case where the user P performs authentication on the user terminal 30 and then performs scanning, attribute information of the user P is assigned to image information generated by the scanning.

The term "prohibited information" denotes information representing, for example, a specific character, shape, figure, or color. In the following exemplary embodiments, a case where the prohibited information is specific characters (a prohibited word) will be described. The specific characters represent, for example, "secret", "concealment", "company secret", "prohibited", or "copy prohibited".

Note that the attribute information and the prohibited information is input in the information processing system 10 via an input unit (not illustrated) or the communication interface 15 and is registered in advance in the registration unit 101.

The controller 102 receives the image information from the user terminal 30 via the communication interface 15. Further, the controller 102 refers to the attribute information registered in the registration unit 101 and the prohibited information associated with the attribute information. If the received image information includes the prohibited information associated with attribute information assigned to the image information, the controller 102 performs predetermined error handling.

The term "error handling" denotes, for example, processing for discarding image information without transmitting the image information to the corresponding server 20, processing for prohibiting image information transmission to the server 20, and processing for reporting that image information is not stored in the server 20.

The action of the system 10 will be described.

Figure 4:
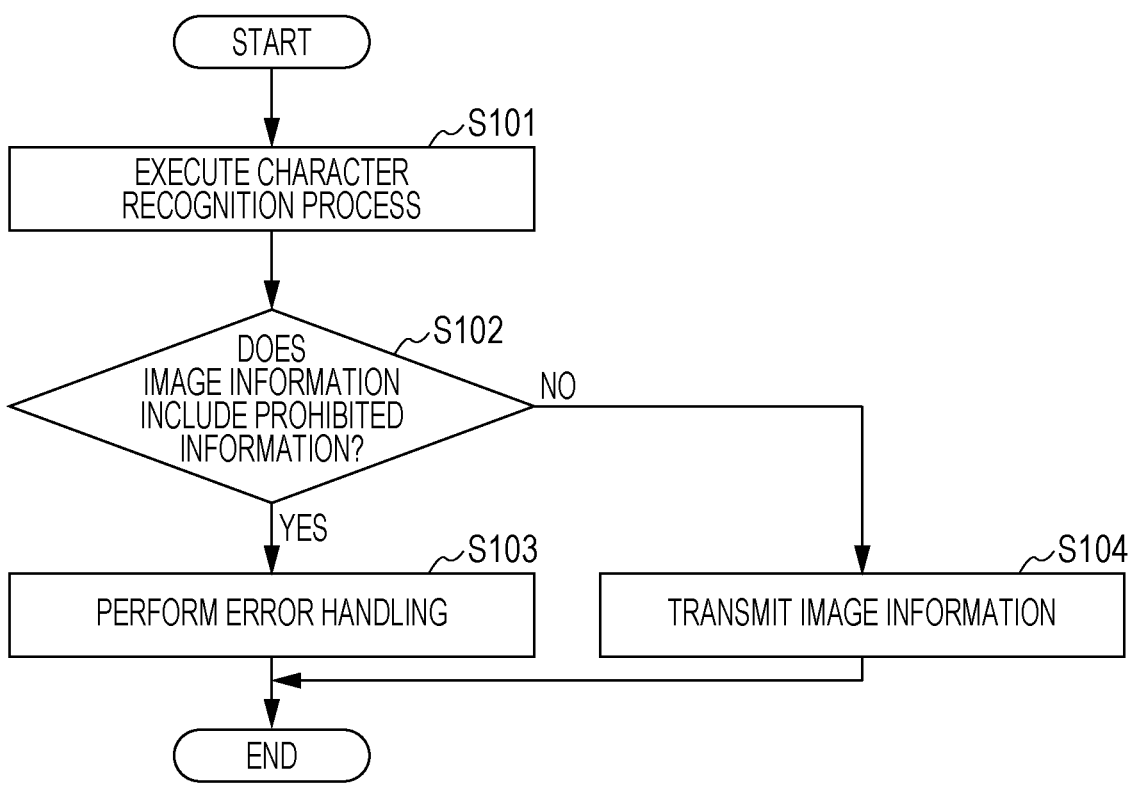
FIG. 4 is a flowchart illustrating the flow of a process executed by the information processing system according to the first exemplary embodiment.

FIG. 4 is a flowchart illustrating the flow of a process executed by the information processing system 10 according to the first exemplary embodiment. In this exemplary embodiment, the CPU 11 reads out the information processing program from the ROM 12 or the storage 14, loads the program into the RAM 13, and runs the program, and thereby the process is executed. The process illustrated in FIG. 4 is executed in such a manner that image information transmitted from the user terminal 30 is received by the information processing system 10 via the communication interface 15.

In step S101, the CPU 11 serving as the controller 102 executes a character recognition process on the image information received from the user terminal 30. The process then moves to step S102.

In step S102, the CPU 11 refers to the registration unit 101 and determines whether prohibited information (specific characters) associated with the attribute information assigned to the received image information is included in characters acquired in the character recognition process. If the prohibited information is included in the image information (step S102: YES), the CPU 11 moves the process to step S103.

In step S103, the CPU 11 performs predetermined error handling. The CPU 11 then terminates the process illustrated in FIG. 4.

In contrast, if the prohibited information is not included in the image information in step S102 (step S102: NO), the CPU 11 moves the process to step S104.

In step S104, the CPU 11 transmits the received image information outward via the communication interface 15. The CPU 11 may temporarily transmit the image information to a different apparatus or the like without transmitting the image information directly to the server 20. The CPU 11 then terminates the process illustrated in FIG. 4.

Second Exemplary Embodiment

An information processing system 10 according to a second exemplary embodiment of the present disclosure will be described by using FIG. 5. In the first exemplary embodiment, the aspect in which transmitting the image information to the server 20 is avoided in the error handling has been described. In the second exemplary embodiment, an aspect in which a page including prohibited information is replaced as the error handling will be described. Note that the second exemplary embodiment uses a concept in which image information has one or more pages, and the image information is information representing an image in at least one page. Since an information processing system according to the second exemplary embodiment is a modification of the information processing system according to the first exemplary embodiment, the same components are appropriately denoted by the same reference numerals, and overlapping content is not described.

The hardware configuration and the functional configuration of the information processing system 10 in this exemplary embodiment are basically the same as those in the first exemplary embodiment, and thus the description thereof is not provided.

Hereinafter, the action of the system 10 according to the second exemplary embodiment will be described.

In this exemplary embodiment, the CPU 11 reads out the information processing program from the ROM 12 or the storage 14, loads the program into the RAM 13, and runs the program, and thereby a process is executed.

Figure 5:
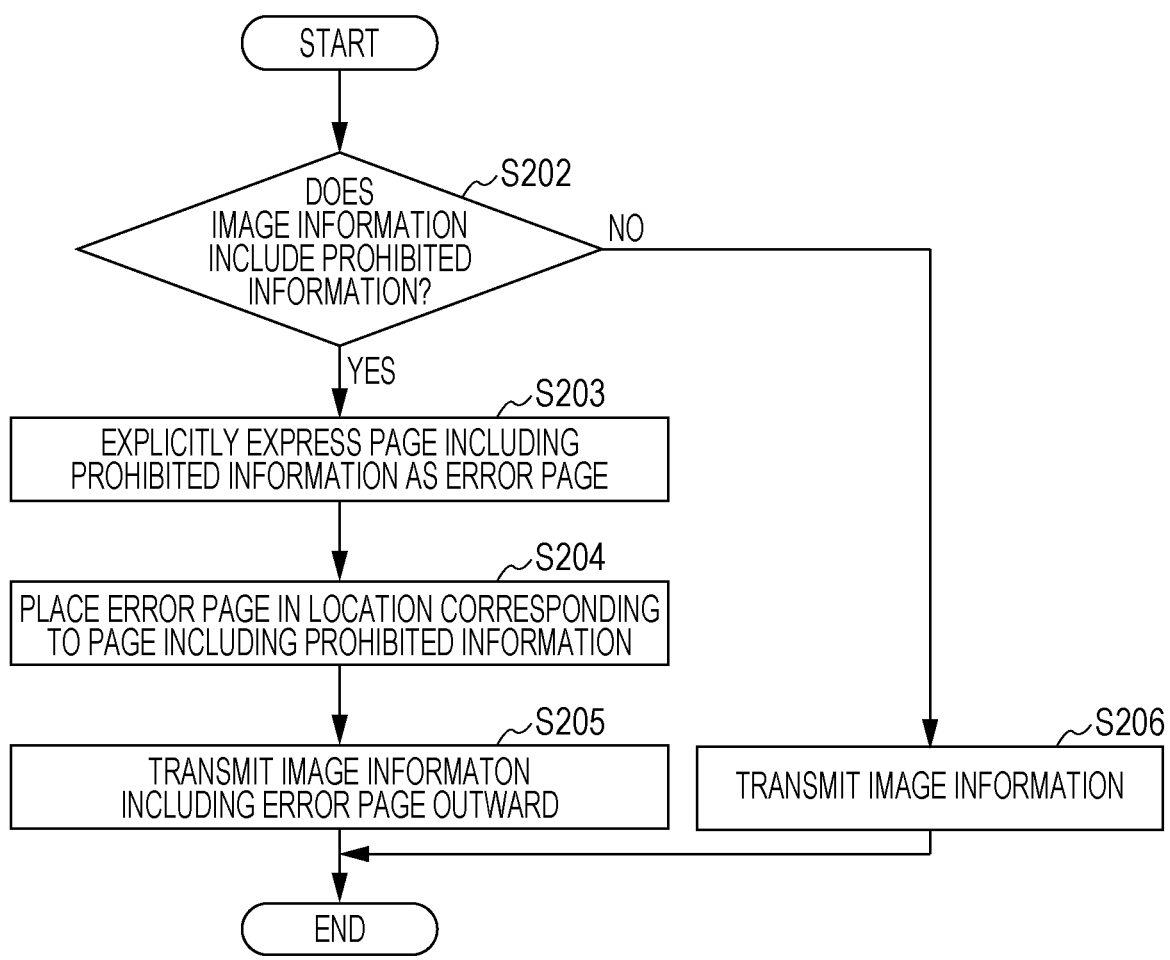
FIG. 5 is a flowchart illustrating an example flow of a process executed by an information processing system according to a second exemplary embodiment.

The process illustrated in FIG. 5 is executed in such a manner that image information transmitted from the user terminal 30 is received by the system 10 via the communication interface 15.

In step S202, if prohibited information is included in at least one of the pages of the image information (step S202: YES), the CPU 11 moves the process to step S203.

In step S203, the CPU 11 explicitly expresses the page including the prohibited information as an error page. The CPU 11 then moves the process to step S204.

Examples of a method for explicitly expressing an error page include displaying the page including the prohibited information in a specific color such as gray, displaying the entire page as a solid color page (or a blank page), or displaying information "secret included" in the page.

In step S204, the CPU 11 places the error page in the image information in a location corresponding to the page including the prohibited information. This clearly locates the page corresponding to the error page. The CPU 11 then moves the process to step S205.

In step S205, the CPU 11 outward transmits the image information having the error page placed in step S204. The CPU 11 then terminates the process illustrated in FIG. 4.

In contrast, if the prohibited information is not included in any page in the image information in step S202 (step S202: NO), the CPU 11 moves the process to step S206.

In step S206, the CPU 11 transmits the received image information outward via the communication interface 15. The CPU 11 then terminates the process illustrated in FIG. 5.

Third Exemplary Embodiment

An information processing system 10 according to a third exemplary embodiment of the present disclosure will be described by using FIG. 6. Since an information processing system according to the third exemplary embodiment is a modification of the information processing systems according to the first and second exemplary embodiments, the same components are appropriately denoted by the same reference numerals, and overlapping content is not described.

The hardware configuration and the functional configuration of the information processing system 10 in this exemplary embodiment are basically the same as those in the first and second exemplary embodiments, and thus the description thereof is not provided.

Hereinafter, the action of the system 10 according to the third exemplary embodiment will be described.

In this exemplary embodiment, the CPU 11 reads out the information processing program from the ROM 12 or the storage 14, loads the program into the RAM 13, and runs the program, and thereby a process is executed.

Figure 6:
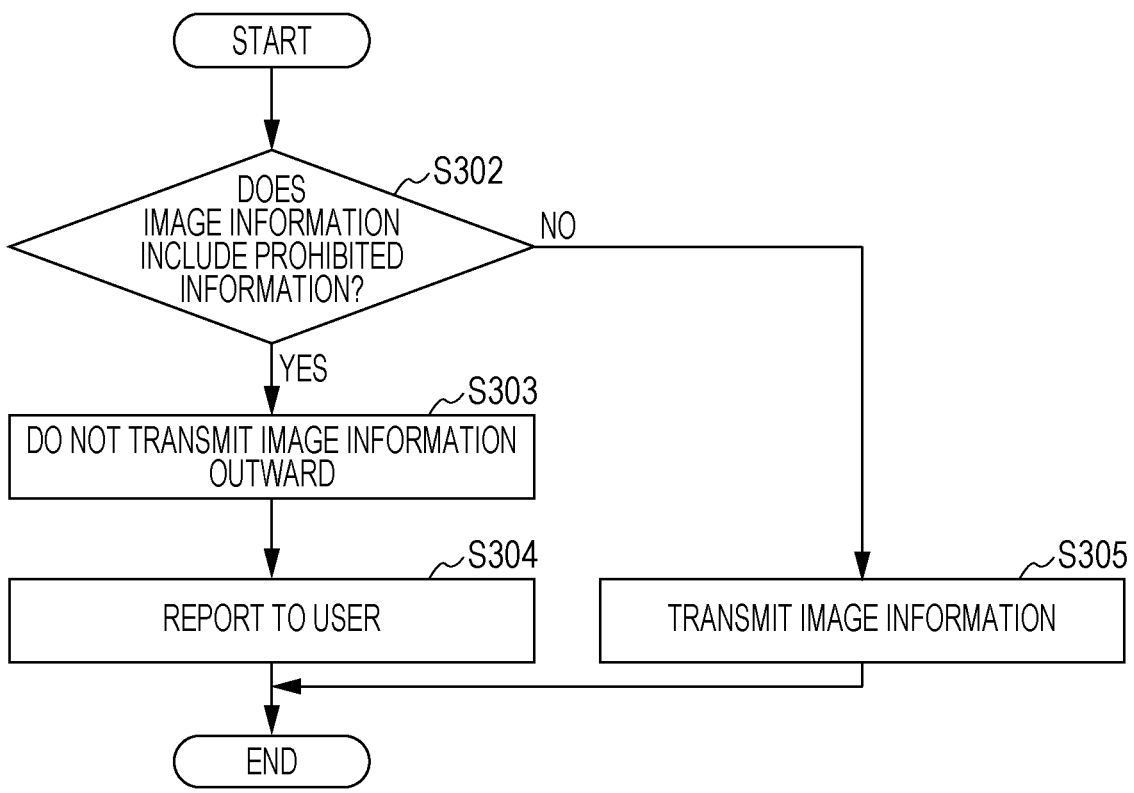
FIG. 6 is a flowchart illustrating the flow of a process executed by an information processing system according to a third exemplary embodiment.

The process illustrated in FIG. 6 is executed in such a manner that image information transmitted from the user terminal 30 is received by the system 10 via the communication interface 15.

In step S302, if the prohibited information is included in at least one of the pages of the image information (step S302: YES), the CPU 11 moves the process to step S303.

In step S303, the CPU 11 does not outward transmit image information including the prohibited information even in one page. The CPU 11 then moves the process to step S304.

In step S304, the CPU 11 reports to the user P that the outward transmission of the image information is not performed and the reason therefor. The CPU 11 then terminates the process illustrated in FIG. 6.

Note that reporting to a user herein is performed via the communication interface 15. The reporting may be performed via the network 50 or in accordance with the separately used standard, such as Ethernet (registered trademark), FDDI, or Wi-Fi (registered trademark).

The user P may receive the report via the user terminal 30 or by using a terminal 40 (an electronic terminal such as a PC or a smartphone) of the user P, separately from the user terminal 30. Further, the user P may receive the report by using any of these terminals through e-mail, an application capable of receiving a message other than the e-mail, or the like.

Examples of the reason why the outward transmission of the image information is not performed that is reported to the user P may include a message or the like indicating that the image information includes the prohibited information associated with the user P.

In contrast, if the prohibited information is not included in even one page of the image information in step S302 (step S302: NO), the CPU 11 moves the process to step S305.

In step S305, the CPU 11 transmits the received image information outward via the communication interface 15. The CPU 11 then terminates the process illustrated in FIG. 6.

Fourth Exemplary Embodiment

An information processing system 10 according to a fourth exemplary embodiment of the present disclosure will be described by using FIG. 7. Since an information processing system according to the fourth exemplary embodiment is a modification of the information processing systems according to the first to third exemplary embodiments, the same components are appropriately denoted by the same reference numerals, and overlapping content is not described.

The hardware configuration and the functional configuration of the information processing system 10 in this exemplary embodiment are basically the same as those in the first to third exemplary embodiments, and thus the description thereof is not provided.

Hereinafter, the action of the system 10 according to the fourth exemplary embodiment will be described.

In this exemplary embodiment, the CPU 11 reads out the information processing program from the ROM 12 or the storage 14, loads the program into the RAM 13, and runs the program, and thereby a process is executed.

The process illustrated in FIG. 7 is executed in such a manner that image information transmitted from the user terminal 30 is received by the system 10 via the communication interface 15.

In this exemplary embodiment, an external server 20 serving as a destination for transmitting image information is one of the multiple servers 20 that is selected by the user P, the multiple servers 20 being connected via the network 50. In addition, prohibited information registered in the registration unit 101 in association with attribute information on a per attribute information basis is registered further in association with one of the servers 20 on a per server basis.

In step S402, the CPU 11 determines whether prohibited information is included in image information and whether the server 20 associated with the prohibited information has been designated as the destination by the user P. If the prohibited information is included in the image information, and if the server 20 associated with the prohibited information has been designated as the destination by the user P (step S402: YES), the CPU 11 moves the process to step S403.

In step S403, if there is a server 20 not associated with the prohibited information other than the destination designated by the user P (step S403: YES), the CPU 11 moves the process to step S404.

In step S404, the CPU 11 reports information regarding the different server 20 not associated with the prohibited information to the user P. To report the information, the information may be received via the user terminal 30 or by using the terminal 40 (an electronic terminal such as a PC or a smartphone) of the user P separately provided from the user terminal 30. Further, the user P may receive the report by using any of these terminals through e-mail, an application capable of receiving a message other than the e-mail, or the like. The CPU 11 then terminates the process illustrated in FIG. 7.

In contrast, if there is no server 20 not associated with the prohibited information in step S403 other than the destination designated by the user P (step S403: NO), the CPU 11 moves the process to step S405.

In step S405, the CPU 11 performs predetermined error handling. The CPU 11 then terminates the process illustrated in FIG. 7.

In contrast, if the prohibited information is not included in the image information in step S402, or if the prohibited information is included therein but the destination designated by the user P is not the server 20 associated with the prohibited information (step S402: NO), the CPU 11 moves the process to step S406.

In step S406, the CPU 11 transmits the received image information outward via the communication interface 15. The CPU 11 then terminates the process illustrated in FIG. 7.

Note that step S402 may be a step in which the CPU 11 refers to the prohibited information associated with the attribute information in the registration unit 101 on the basis of the type of the cloud server 20 designated as the destination by the user P. Referring to the prohibited information on the basis of the type of the cloud server 20 in this manner enables addition of a step for determining the necessity for performing the processing for determining whether the image information transmitted from the user terminal 30 includes the prohibited information. Adding such a step enables in some cases, for example, the CPU 11 to omit the processing for determining whether the image information includes the prohibited information, depending on the relationship between the attribute information and the designated cloud server. The throughput in the CPU 11 may thus be reduced.

In addition, step S402 may be divided into two steps for determining whether the image information includes the prohibited information and for determining whether the prohibited information is associated with the server 20 designated by the user P. Dividing the step in this manner enables reduction of an amount of information referred to in the registration unit 101 by the CPU 11.

In addition, in step S404, the CPU 11 may report to the user P to prompt the user P to select a different server 20 after reporting the information regarding the different server 20 not associated with the prohibited information to the user P. In this case, the system 10 may further be configured such that the user P selects a preferable one of candidates among the multiple servers 20 and reports the selected server 20 to the CPU 11. This enables the user P to omit an operation for newly selecting the different server 20 and transmitting the image information thereto. Note that the user P may communicate with the CPU 11 in the same manner as in communications from the CPU 11 to the user P or by using the user terminal 30.

As the fourth exemplary embodiment, the following example in designating a server 20 as an image information transmission destination has been described. Specifically, if the image information includes the prohibited information, and if the server 20 is associated with the prohibited information (a server is associated with a need for error handling), the error handling is performed. Note that the designated destination is not limited to the server 20. Not only the server 20 but also, for example, a specific user or group may be designated as the destination (a disclosure target). In this case, prohibited information registered in the registration unit 101 in association with attribute information on a per attribute information basis is registered further in association with a user or a group on a per user or group basis. If the user or the group associated with the prohibited information is designated as the destination, and if the image information includes the prohibited information, the error handling is performed, and transmission of the image information to the destination is restrained. Specifically, for example, if prohibited information associated with the attribute information of the user P belonging to Development Department is associated with every department other than Development Department, the transmission of the image information to Development Department is not restrained, and transmission to users in the departments other than Development Department is restrained. This enables disclosure only to Development Department, in other words, such restraint as hiding the image information from the departments other than Development Department.

Other Embodiments

The information processing apparatus according to the exemplary embodiments has heretofore been described; however, it goes without saying that various modes may be implemented without departing from the spirit of the present disclosure.

In each exemplary embodiment, if image information includes prohibited information, error handling is performed. However, the condition for prohibited information inclusion may be restrained to perform the error handling. For example, if the size of a character, a figure, or the like represented by the prohibited information is larger than or equal to a predetermined size, the error handling may be performed. A character or a symbol representing prohibited information such as "company secret", "copy prohibited", or shading is conveniently expressed in a larger size than that of characters in the body of a document in some cases. The restraint based on the character size enables the prevention of the recognition of the characters in the body as the prohibited information. In addition, only if the image information includes the prohibited information in a page of the image information representing an image in a predetermined location, for example, in the margin for the body, the error handling may be performed. There is a case where the prohibited information is conveniently expressed in a part except the body. The restraint on the inclusion of the prohibited information in the margin enables the prevention of the recognition of the characters in the body as the prohibited information.

In each exemplary embodiment, outdating of information is not taken into consideration; however, this may be taken into consideration. For example, the following exception may be provided. Specifically, date information included in image information is referred to. If a predetermined time or longer has been elapsed at the present time, the above-described error handling is not performed. In this case, for example, the character recognition is performed on the image information, and date information included in the image is acquired. Alternatively, date and time information provided in advance in the image information may be acquired.

In the description for each exemplary embodiment, each server 20 is composed of one server but may be composed of multiple servers divided in accordance with their responsible functions or processing steps. The processing described in the exemplary embodiment may also be implemented by a dedicated hardware circuit. In this case, the processing may be performed by one or multiple pieces of hardware.

A program for running the system 10 may be provided by using a computer readable recording medium such as an universal serial bus (USB) memory, a flexible disk, or a compact disc read only memory (CD-ROM), or on-line via a network such as the Internet. In this case, the program recorded in the computer readable recording medium is typically transferred to and stored in a memory, a storage, or the like. In addition, the program may be provided, for example, as one piece of application software or may be incorporated, as a function of the system 10, in the software for an apparatus of the system 10. The implementation may be performed in such a manner that part or all of the exemplary embodiments are combined.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing system comprising:
a processor, configured to:
register prohibited information associated with at least one of pieces of attribute information to be assigned to image information on a per piece-of-attribute information basis;
refer to the pieces of attribute information and the prohibited information; and
perform error handling if received image information includes the prohibited information associated with a piece of attribute information assigned to the received image information,
wherein if the prohibited information associated with the piece of attribute information is included in at least one page of a plurality of pages of the received image information,
the processor transmits the received image information outward in the error handling, excluding information representing the page including the prohibited information from the received image information.

2. The information processing system according to claim 1,
wherein the processor explicitly expresses the page including the prohibited information as an error page.

3. The information processing system according to claim 2,
wherein the processor places the error page in the received image information in a location corresponding to the page including the prohibited information.

4. The information processing system according to claim 3,
wherein the processor executes a character recognition process on the received image information, and if a character recognized in the character recognition process includes a character designed as the prohibited information associated with the piece of attribute information, the processor performs the error handling.

5. The information processing system according to claim 2,
wherein there are a plurality of external servers that are to receive image information, and necessity for performing the error handling is set in advance and is associated with at least one of the external servers on a per external-server basis, and wherein the processor decides the necessity for performing the error handling depending on one of the external servers that is designated by a user.

6. The information processing system according to claim 2, wherein the processor executes a character recognition process on the received image information, and if a character recognized in the character recognition process includes a character designed as the prohibited information associated with the piece of attribute information, the processor performs the error handling.

7. The information processing system according to claim 1, wherein the pieces of the attribute information are grouped into at least one group of groups, and the prohibited information is associated with at least one of the groups on a per group basis.

8. The information processing system according to claim 7, wherein the processor decides necessity for performing the error handling depending on the prohibited information associated with the at least one of the grouped pieces of attribute information.

9. The information processing system according to claim 1, wherein there are a plurality of external servers that are to receive image information, and necessity for performing the error handling is set in advance and is associated with at least one of the external servers on a per external-server basis, and wherein the processor decides the necessity for performing the error handling depending on one of the external servers that is designated by a user.

10. The information processing system according to claim 9, wherein if the prohibited information associated with the piece of attribute information is included in the image information, and if there is an external server for which the error handling does not need to be performed among the external servers, the processor reports, to the user, the external server for which the error handling does not need to be performed.

11. The information processing system according to claim 10, wherein the external servers are cloud servers.

12. The information processing system according to claim 9, wherein the external servers are cloud servers.

13. The information processing system according to claim 1, wherein the processor executes a character recognition process on the received image information, and if a character recognized in the character recognition process includes a character designed as the prohibited information associated with the piece of attribute information, the processor performs the error handling.

14. A non-transitory computer readable medium storing a program causing a computer to execute a process for information processing system control, the process comprising:

referring to prohibited information associated with attribute information to be assigned to image information registered in a registration unit on a per attribute-information basis; and causing a controller to perform error handling if received image information includes the prohibited information associated with a piece of the attribute information;

wherein if the prohibited information associated with the piece of attribute information is included in at least one page of a plurality of pages of the received image information, causing the controller to transmit the received image information outward in the error handling, excluding information representing the page including the prohibited information from the received image information.

* * * * *